Figure 1:
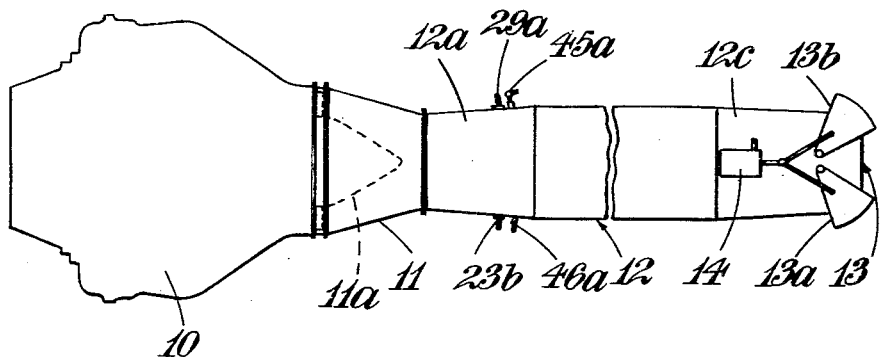

May 17, 1955 F. M. JOHNSON ET AL 2,708,339
COMBUSTION EQUIPMENT FOR GAS-TURBINE ENGINE
HAVING MAIN AND PILOT FUEL INJECTOR MEANS
Filed April 24, 1950 5 Sheets-Sheet 1

INVENTORS
FRANCIS M. JOHNSON
+ ERNEST MILNER
BY
Wilkinson + Mawhinney
ATTORNEYS

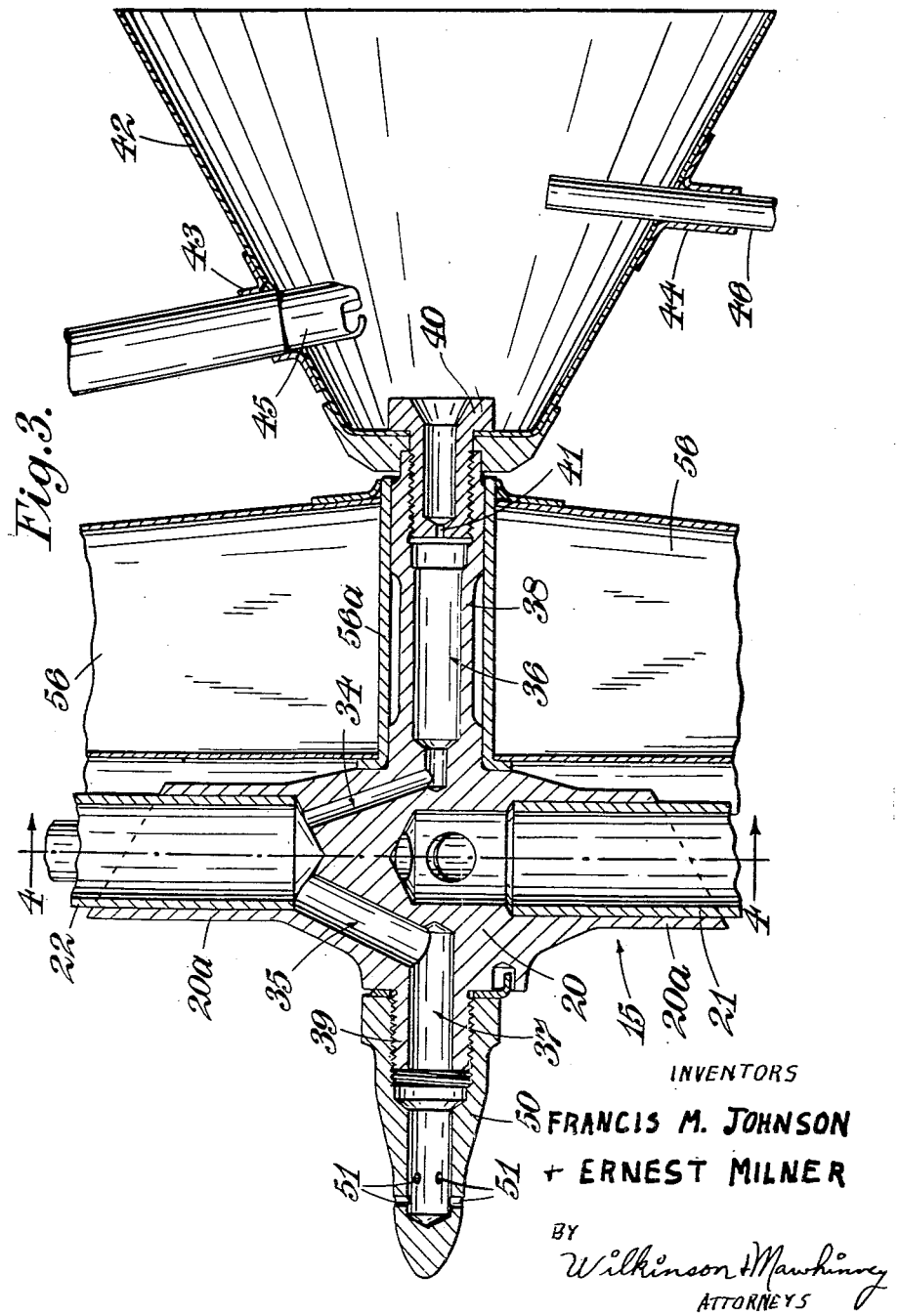

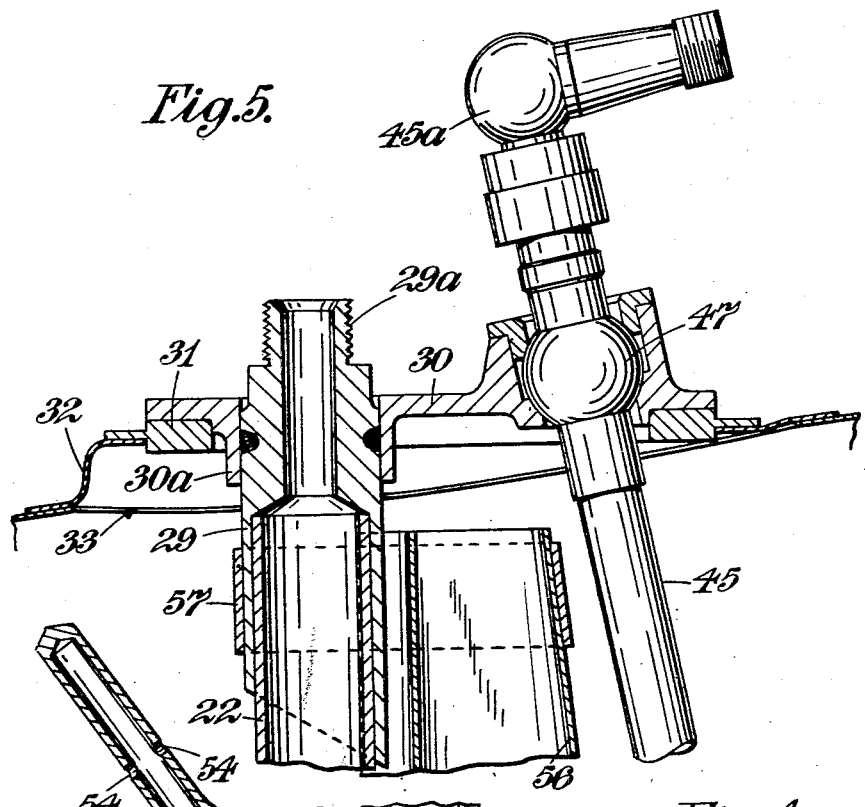
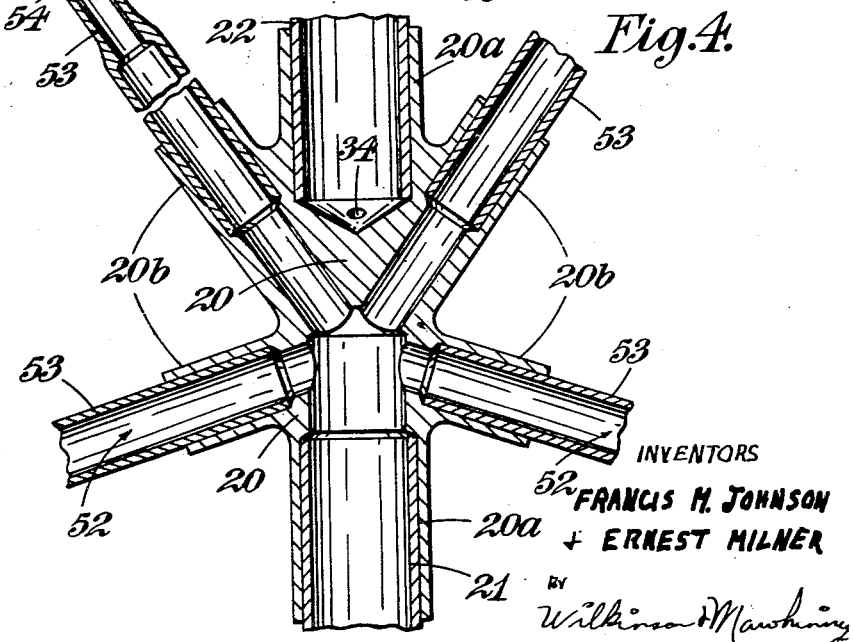

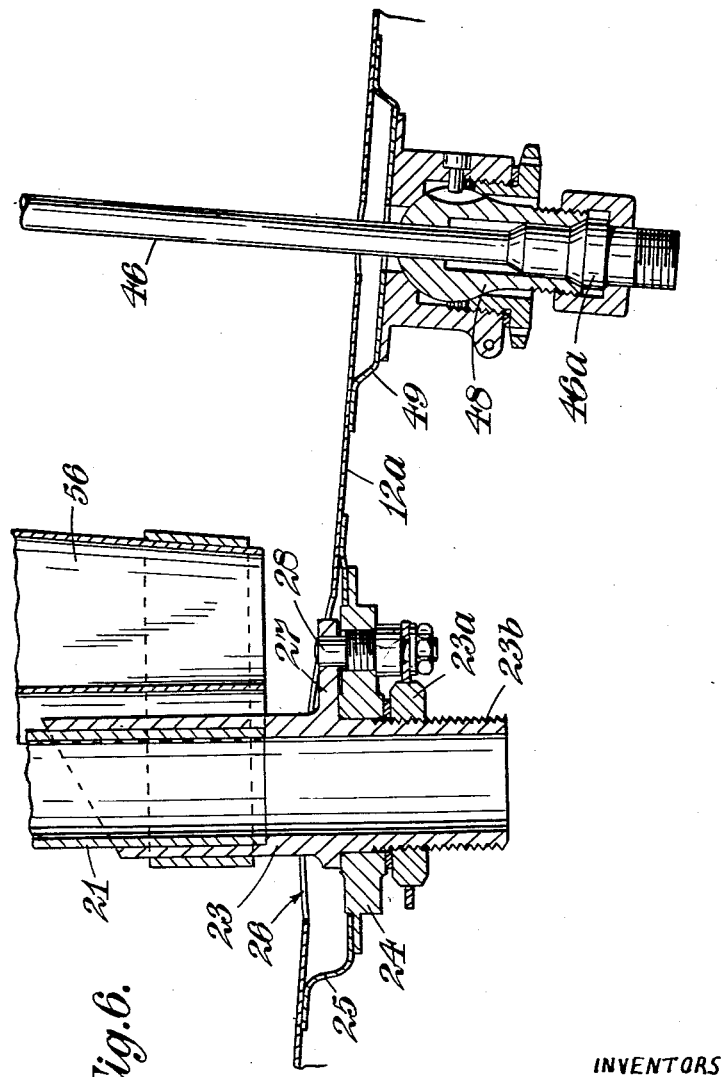

United States Patent Office 2,708,339
Patented May 17, 1955

2,708,339

COMBUSTION EQUIPMENT FOR GAS-TURBINE ENGINE HAVING MAIN AND PILOT FUEL INJECTOR MEANS

Francis Murray Johnson, Streatham, London, and Ernest Milner, Derby, England, assignors to Rolls-Royce Limited, Derby, England, a British company Application April 24, 1950, Serial No. 157,732

Claims priority, application Great Britain April 28, 1949

10 Claims. (Cl. 60—35.6)

This invention relates to combustion equipment for gas-turbine engines. A simple form of such engine comprises a compressor system delivering air to main combustion equipment from which the combustion products pass through a turbine system; in certain cases in the application of such an engine to aircraft propulsion, it is the practice to burn additional fuel in the exhaust flow from the turbine to reheat it prior to its passing to atmosphere through a propelling nozzle, combustion equipment for this purpose being additional to the main combustion equipment between the compressor and turbine; alternatively in certain more elaborate gas-turbine engines it is the practice to reheat the exhaust gas from a turbine system prior to entry into a second turbine system or from one turbine stage prior to entry into a adjacent stage.

The present invention is concerned with such reheat combustion equipment used for the purpose of reheating the exhaust gas from a turbine and has for an object to provide a system in which the pressure losses are low and which does not have major structural parts subjected to high temperature effects.

In the case of reheat combustion equipment used for heating the exhaust gas after passing through a turbine, it is desirable to provide combustion equipment capable of maintaining continuous combustion in a high-velocity, heated gas flow, and the present invention has particular advantage in this respect.

It should be mentioned that a gas-turbine engine normally operates at a high air/fuel ratio, i. e. there is excess air for cooling, and to ensure that combustion is satisfactorily maintained it has been the practice hitherto to provide a flame tube or tubes within which combustion takes place under approximately correct conditions of air/fuel ratio, the function of the flame tube being to meter the supply of air required for combustion to a combustion zone and to permit the excess air to be added and mix with the products of combustion at an appropriate point. The provision of such a flame tube necessarily results in a pressure loss in the combustion system, and also involves structure which is subjected to high temperature effects.

One object of this invention is to provide a light and strong construction of reheat combustion equipment.

Another object of this invention is to provide a construction of reheat combustion equipment which affords little obstruction to the flow of exhaust gases from the turbine.

In certain applications it may be advantageous to incorporate a ring manifold for main fuel supply to improve the distribution and, in addition, obtain partial stabilization from the ring.

Figure 2:
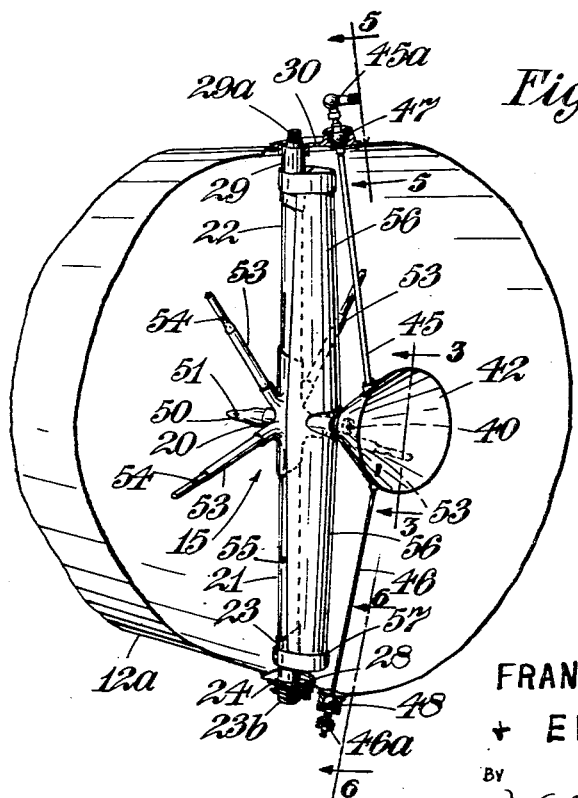
Figure 7:
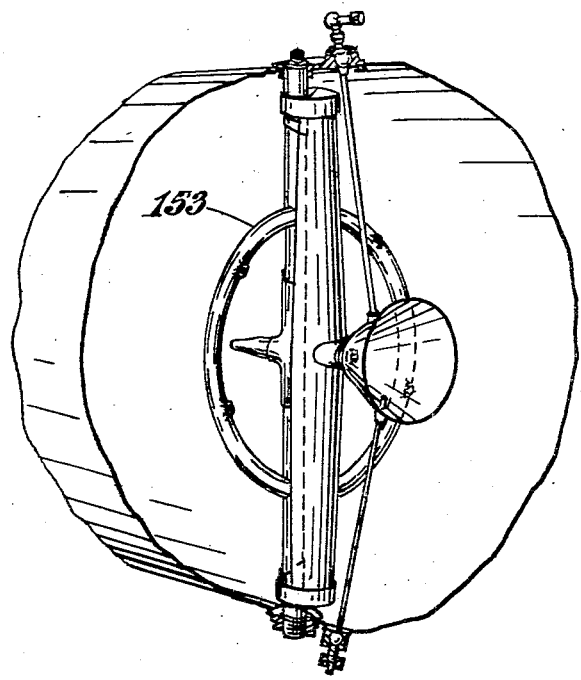

Two embodiments of the invention as applied in an exhaust gas heating combustion system of a gas-turbine jet-propulsion engine will now be described with reference to the accompanying drawings, in which:

Figure 1 is a diagrammatic view of a simple jet-propulsion gas-turbine engine in which exhaust reheating is employed in the jet-pipe, Figure 2 is a perspective view of one form of the reheat combustion equipment suitable for use with a gas-turbine engine as shown in Figure 1, Figure 3 is an axial section on the line 3—3 through the central portion of the fuel-injection equipment of Figure 2, Figure 4 is a section on the line 4—4 of Figure 3, Figures 5 and 6 are axial sections on the lines 5—5 and 6—6, respectively, through the radially outer end portions of the fuel injection equipment of Figure 2, and Figure 7 is a perspective view of another form of reheat combustion equipment suitable for use with a gas-turbine engine, as shown in Figure 1.

Referring to Figure 1, there is illustrated in outline a simple gas-turbine engine 10, which may be of any known or convenient construction comprising a compressor, main combustion equipment connected to receive compressed air from the compressor and to have fuel burnt therein, and a compressor-driving turbine connected to receive hot gases from the combustion equipment.

The engine also comprises an exhaust assembly having an outer wall 11 and a conical fairing 11a within the wall 11 to define an annular passage registering at its inlet end with the outlet from the turbine and communicating at its outlet end with a jet-pipe 12.

Under certain operating conditions of the engine 10, it is desirable to reheat the exhaust gases from the engine 10 in the jet pipe 12 to increase the velocity of the exhaust gases issuing through a jet nozzle 13 at the rear end of the jet-pipe and thus to increase the propulsive thrust obtained from the engine.

When jet-pipe exhaust heating is employed, it is usual to make the nozzle 13 adjustable in area by, for example, providing adjustable segments 13a which can be rocked by a ram 14 to increase the effective area of the nozzle 13. When the exhaust heating is inoperative, the nozzle has a smaller area than when exhaust reheating is operative.

In the arrangement illustrated in the drawings the fuel-injection equipment 15 (Figure 2) is located in the jet pipe 12 adjacent its inlet, that is just downstream of the conical fairing 11a of the exhaust assembly 11, 11a. In the arrangement illustrated, moreover, the cross-sectional area of the jet-pipe 12 is increased locally so as to reduce the gas-velocity in the region in which combustion occurs and for this purpose the jet-pipe 12 comprises a divergent section 12a, a cylindrical section 12b, and a convergent section 12c leading to the adjustable nozzle 13.

The fuel-injection equipment is conveniently located in the divergent portion 12a and the combustion of fuel injected into the duct formed by the jet-pipe takes place to a great extent in the cylindrical portion 12b of the jet pipe.

Referring now to Figures 2 to 6, the fuel injection equipment comprises a spider member 20 located centrally within the exhaust duct. The spider member 20 has a number of radiating arms 20a, 20b, whereof the two arms 20a, which are diametrically opposite one another, are formed as sockets into which a pair of fuel supply pipes 21, 22 by which the spider member 20 is supported from the wall of the jet-pipe portion 12a, are rigidly secured as for example by welding.

The pipes 21, 22 extend through the wall of the jet-pipe portion 12a and pipe 21 is rigidly secured to the wall whilst the pipe 22 is slidingly engaged with the wall to permit relative radial expansion between the fuel-injection equipment 15 and the portion 12a of the jet-pipe 12.

Referring to Figure 6, the pipe 21 is secured in a socket member 23 which is clamped by a nut 23a to a plate-like fitting 24 welded to a dished member 25 secured on the wall of the jet-pipe around an aperture 26 in the wall. The threaded end 23b of the socket member 23 besides receiving the clamping nut 23a, provides a union for connection of a fuel supply pipe. The socket member 23 is formed with an aperture plug 27 to be engaged by a locating pin 28 threaded into the fitting 24 whereby the socket 23 and thus the fuel injection equipment 15 are located in their correct positions axially of the jet-pipe 12.

Referring to Figure 5, the pipe 22 is secured in a socket member 29 which slidingly engages with a sleeve-like portion 30a, of a plate-like fitting 30 arranged to be bolted to a thickened flange ring 31 secured on a dished sheet-metal member 32 welded on the wall of the jet-pipe 12 around an aperture 33 therein. The outer end of the socket member 29 is formed as a union 29a to receive a fuel supply pipe.

The fuel supply pipe 22 is the pilot supply pipe and fuel supplied therethrough to the spider member 20 flows through passages 34, 35 (Figure 3) into axial bores 36, 37 formed respectively in a pair of axial bosses 38, 39 formed centrally of the spider member 20.

The bore 36 leads to a fuel injection nozzle member 40 having a single small orifice 41 through which fuel flows into the jet-pipe. The nozzle member 40 is threaded into the boss 38 and is also employed to hold in place a conical baffle 42 which, as will be seen from Figure 2 of the drawings, has a diameter which is small compared with the diameter of the duct 12a. The conical baffle has its concave face directed downstream and affords a sheltered zone into which the nozzle member 40 injects fuel.

The conical baffle 42 is provided with a pair of apertures encircled by guide collars 43, 44 to slidingly receive respectively the inner ends of a spark-type igniter device 45 and of a temperature sensitive device 46 (such as a thermocouple or resistance thermometer).

The outer end of the igniter device 45 is mounted through a ball and socket joint 47 (Figure 5) on the plate-like fitting 30 and carries at its outer end a suitable insulating fitting 45a for receiving the electrical supply leads.

The outer end of the temperature sensitive device 46 is mounted in a ball and socket joint 48 (Figure 6) carried on a dished sheet-metal member 49 on the outside of the wall of the jet-pipe, and has a suitable fitting 46a to receive the electrical connections.

Axial expansion of the baffle 42 is accommodated by rocking of the igniter device 45 and temperature-sensitive device 46 at the ball and socket joints 47, 48 and by sliding of these parts in the collars 43, 44.

The boss 39 is externally threaded and carries a cap nozzle member 50 formed with a series of fine radial bores 51 through which pilot fuel can be injected into the free stream of exhaust gases in the exhaust duct. The boss 39 as will be seen from Figure 2 is upstream of the baffle 42 and fuel injected into the exhaust gas stream through orifices 51 will be carried downstream past the baffle 42 and part of the pilot fuel will be carried behind the baffle 42 to be ignited by the flame due to burning of fuel from nozzle member 40, and the flame will spread to the remainder of the fuel.

The pipe 21 constitutes the main fuel supply pipe and fuel flowing into the spider member 20 from the pipe 21 enter bores 52 of a series of small diameter tubes 53 which are secured in sockets provided by the arms 20b of the spider member 20. The tubes 53 constitute the main fuel injection devices of the reheat combustion equipment and they extend radially outwards from the spider member 20, are closed at their outer ends and are formed each with a pair of oppositely disposed fuel delivery orifices 54 at a convenient point in their length so that fuel leaving them is delivered into the free stream of exhaust gas in a direction circumferentially of the exhaust duct. Similar orifices 55 are provided in the supply pipe 21. The orifices 54, 55 are, as will be seen, located in a plane at right angles to the jet-pipe axis which plane is just downstream of the pilot fuel orifices 51 and just upstream of the baffle 42. The orifices 54, 55 are also disposed in a ring around the pilot supply orifices at such a radial distance from the axis of the jet-pipe that the fuel issuing from them enters the free stream of exhaust gas in the exhaust duct.

In order to keep the pressure losses in the jet-pipe as low as possible there is provided just downstream of the pipes 21, 22 a sheet metal fairing 56 which give the pipes 21, 22 an aerofoil section. The fairing 56 is engaged by a sleeve portion 56a over the boss 38 and is located at its outer ends by straps 57 which embrace the fairing 56 and sockets 23, 29 for the pipes 21, 22.

In operation of the gas-turbine engine 10, when reheating of the exhaust gases in the jet-pipe 12 is required, fuel is supplied through pipe 22 to the pilot fuel orifices 51 and to the orifice 41 which may be considered as an igniter fuel jet. Simultaneously the spark igniter device 45 is operated so that fuel emerging from the igniter fuel jet 41 is ignited producing an igniter flame in the sheltered region within the baffle 42. The fuel from the pilot fuel orifices 51 is carried downstream in the exhaust gas and part of the pilot fuel enters behind the baffle 42 to be ignited by the igniter flame from the igniter fuel jet 41. It has been found that with this arrangement a stable pilot flame can be produced under varying gas flows with a constant pilot fuel flow.

When the main fuel supply for reheating purposes is effected through the orifices 54, 55, the fuel is carried downstream by the exhaust gas partly into the combustion zone of the pilot fuel, thereby to be ignited, and the flame is propagated from the pilot fuel combustion zone to the remainder of the main fuel.

In certain applications, it may be advantageous to incorporate a ring manifold for the main fuel supply to improve the distribution and, in addition, to obtain partial stabilization from the ring. Such a construction of reheat combustion equipment is shown in Figure 7. This construction is similar to that shown in Figure 2 except that a ring manifold 153 is employed for the main fuel supply instead of the tubes 53.

It will be appreciated that there will be a rapid heat transfer to the main fuel from the exhaust gas and from the burning pilot fuel and that the main fuel will be preheated to a substantial extent in the tubes 53 or ring manifold 153. In this way a fuel and exhaust gas mixture, which latter contains a substantial proportion of air, will be produced having such an elevated temperature and such a fuel/air strength that the mixture will have a velocity of flame propagation in excess of the velocity of gas flow through the jet-pipe so that combustion of the fuel will be completed in the jet-pipe.

Tests have shown that stable combustion is obtained with the arrangement of the invention over a widely varying range of main fuel flows.

A particular advantage of the arrangement of this invention is that since the main fuel injectors 53 or ring manifold 153 need not be provided with individual baffles or flame tubes to ensure ignition of the fuel, the pressure losses in the system are kept small and the design of the combustion equipment is not unduly complicated.

We claim:

1. In a gas-turbine engine comprising a compressor, main combustion equipment connected to receive compressed air from said compressor and to have fuel burnt therein, a compressor-driving turbine connected to receive hot gases from said main combustion equipment, and reheat combustion equipment to reheat exhaust gases from said turbine; a construction of said reheat combustion equipment comprising a duct through which said exhaust gases flow at a high velocity, a mounting strut extending across and carried by said duct, a conical baffle in said duct supported by said mounting strut, said conical baffle having a diameter which is small compared with the diameter of said duct and being arranged with its concave face directed downstream, a first pilot fuel injector carried by said mounting strut and arranged to spray fuel into said baffle, a second pilot fuel injector carried by said mounting strut and arranged to spray fuel into said duct upstream of said baffle and adjacent thereto, so that the spray of fuel from said second pilot fuel injector is carried by said gases around said baffle and stable combustion of fuel supplied through said pilot fuel injectors is obtained, and a plurality of main fuel injectors carried by said mounting strut and disposed around said pilot fuel injectors and said baffle in said duct and arranged to spray fuel into the free stream of exhaust gases flowing at a high velocity through said duct adjacent said pilot fuel injectors and said baffle, in such manner that the pilot flame stabilizes the combustion of fuel delivered by said main fuel injectors.

2. Reheat combustion equipment according to claim 1, wherein said pilot fuel-injectors and said baffle are located centrally in said duct and wherein said main fuel-injectors are located approximately in a transverse plane of said duct containing said pilot fuel-injectors and said baffle.

3. In a gas-turbine engine comprising a compressor, main combustion equipment connected to receive compressed air from said compressor and to have fuel burnt therein, a compressor-driving turbine connected to receive hot gases from said main combustion equipment, and reheat combustion equipment to reheat exhaust gases from said turbine; a construction of said reheat combustion equipment comprising a duct through which said exhaust gases flow at a high velocity, a spider arrangement having two radiating arms arranged to constitute pilot and main fuel supply pipes respectively, and two arms extending across said duct and being carried by said duct to support said spider arrangement within said duct, said spider ararngement having a plurality of further radiating arms extending part way only across said duct and providing main fuel-injectors to inject fuel into the free stream of said exhaust gases flowing at a high velocity through said duct, said further radiating arms being hollow and communicating at their inner ends with said main fuel supply pipe, and a pilot fuel-injector and associated baffle or flame tube supported by said spider arrangement and located at the center thereof, said pilot fuel-injector being connected to said pilot fuel supply pipe, said associated baffle or flame tube having a diameter which is small compared with the diameter of said duct, and said pilot fuel-injector and associated baffle or flame tube being arranged to produce a pilot flame of a self-supporting nature to stabilize the combustion of fuel delivered by said main fuel-injectors.

4. Reheat combustion equipment as claimed in claim 3, wherein the radiating arms providing the main fuel-injectors are tubes, each having orifices in the length thereof to introduce the fuel circumferentially of the duct.

5. In a gas-turbine engine comprising a compressor, main combustion equipment connected to receive compressed air from said compressor and to have fuel burnt therein, a compressor-driving turbine connected to receive hot gases from said main combustion equipment, and reheat combustion equipment to reheat exhaust gases from said turbine; a construction of said reheat combustion equipment comprising a duct through which said exhaust gases flow at a high velocity, a spider arrangement having two radiating arms arranged to constitute pilot and main fuel supply pipes respectively and to support said spider arrangement within said duct, said arms being diametrically opposed to one another, and one of said arms being rigidly secured to the wall of said duct and the other of said arms being slidingly engaged with the wall of said duct, said spider arrangement having a plurality of further radiating arms extending part way only across said duct and providing main fuel injectors to inject fuel into the free stream of said exhaust gases flowing at a high velocity through said duct, said further radiating arms being hollow and communicating at their inner ends with said main fuel supply pipe, and a pilot fuel-injector and associated baffle or flame tube supported by said spider arrangement and located at the center thereof, said pilot fuel-injector being connected to said pilot fuel supply pipe, said associated baffle or flame tube having a diameter which is small compared with the diameter of said duct, and said pilot fuel-injector and associated baffle or flame tube being arranged to produce a pilot flame of a self-supporting nature to stabilize the combustion of fuel delivered by said main fuel-injectors.

6. Reheat combustion equipment according to claim 5, wherein the radiating arms providing the main fuel-injectors are tubes, each having orifices in the length thereof to introduce fuel circumferentially of the duct.

7. In a gas-turbine engine comprising a compressor, main combustion equipment connected to receive compressed air from said compressor and to have fuel burnt therein, a compressor-driving turbine connected to receive hot combustion products from said main combustion equipment, and reheat combustion equipment to reheat exhaust gases from said turbine; a construction of said reheat combustion equipment comprising a duct through which said exhaust gases flow at a high velocity, a spider member having a number of radiating arms, two of said radiating arms being arranged to constitute pilot and main fuel supply pipes respectively and being carried by said duct to support said spider arrangement within said duct, and the remainder of said radiating arms providing main fuel injectors to inject fuel into the free stream of said exhaust gases flowing at a high velocity through said duct, said remainder of said radiating arms being hollow and communicating at their inner ends with said main fuel supply pipe, a downstream-extending pilot fuel injector formed centrally of said spider member and connected to said pilot fuel supply pipe, a conical baffle surrounding said downstream-extending fuel injector and having its concave face directed downstream, whereby fuel from the downstream pilot injector is injected into said baffle, said conical baffle having a diameter which is small compared with the diameter of said duct, and an electrical igniter device to ignite fuel injected by the downstream-extending pilot fuel injector, whereby a pilot flame of self-supporting nature is provided to stabilize the combustion of fuel delivered by said main fuel injectors.

8. Reheat combustion equipment according to claim 7 wherein the radiating arms providing the main fuel-injectors are tubes each having orifices in the length thereof to introduce fuel circumferentially of the duct.

9. In a gas-turbine engine comprising a compressor, main combustion equipment connected to receive compressed air from said compressor and to have fuel burnt therein, a compressor-driving turbine connected to receive hot gases from said main combustion equipment, and reheat combustion equipment to reheat exhaust gases from said turbine; a construction of said reheat combustion equipment comprising a duct through which said gases flow at a high velocity, a spider arrangement having two radiating arms arranged to constitute pilot and main fuel supply pipes respectively, and to support said spider arrangement within said duct, said arms being diametrically opposed to each other, and one of said arms being rigidly secured to the wall of said duct and the other of said arms being slidingly engaged with the wall of said duct, said spider arrangement having a plurality of further radiating arms extending part way only across said duct and providing main fuel-injectors to inject fuel into the free stream of said exhaust gases flowing at a high velocity through said duct, said further radiating arms being hollow and communicating at their inner ends with said main fuel supply pipe, an upstream-extending pilot fuel injector and a downstream-extending pilot fuel-injector, said pilot fuel injectors being formed centrally of said spider arrangement and connected to said pilot fuel supply pipe, a conical baffle having a diameter which is small compared with the diameter of said duct, said conical baffle being carried on one of said pilot fuel-injectors and arranged with its concave face directed downstream, whereby fuel from the downstream pilot fuel-injector is sprayed into said conical baffle, and an electrical igniter device to ignite fuel from the downstream pilot fuel-injector, said downstream pilot fuel-injector and said baffle being arranged to produce a pilot flame of a self-supporting nature to stabilize combustion of fuel delivered by said main fuel-injectors.

10. Reheat combustion equipment according to claim 9 wherein the radiating arms providing the main fuel-injectors are tubes each having orifices in the length thereof to introduce fuel circumferentially of the duct.

References Cited in the file of this patent

UNITED STATES PATENTS

| | | |
|---|---|---|
| 2,385,833 | Nahigyan | Oct. 2, 1945 |
| 2,482,505 | Pierce | Sept. 20, 1949 |
| 2,520,388 | Earl | Aug. 29, 1950 |
| 2,540,594 | Price | Feb. 6, 1951 |
| 2,580,591 | Pouit | Jan. 1, 1952 |
| 2,607,191 | Lee | Aug. 19, 1952 |
| 2,612,749 | Tenney et al. | Oct. 7, 1952 |

FOREIGN PATENTS

| | | |
|---|---|---|
| 266,196 | Switzerland | Apr. 17, 1950 |
| 920,387 | France | Jan. 4, 1947 |
| 920,910 | France | Jan. 8, 1947 |

(Corresponds to Swiss No. 266,196)